Oct. 25, 1949.    W. J. TROTT    2,485,790
METHOD OF PERCUSSIVE WELDING
Original Filed July 31, 1944

Inventor
Winfield J. Trott
By Attorneys
Blackmor, Spence & Flint

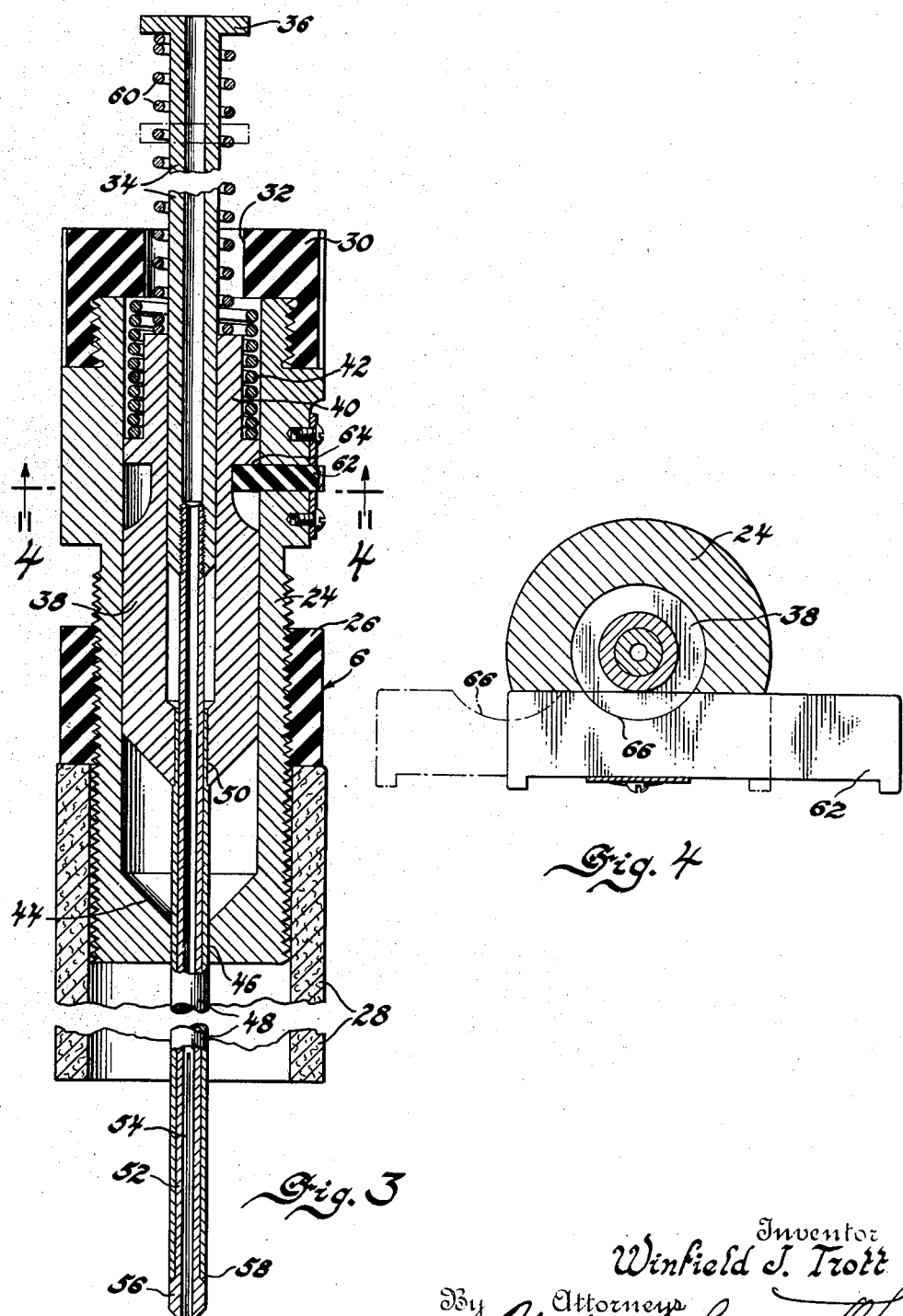

Patented Oct. 25, 1949

2,485,790

UNITED STATES PATENT OFFICE

2,485,790

METHOD OF PERCUSSIVE WELDING

Winfield J. Trott, Detroit, Mich., assignor to General Motors Corporation, Detroit, Mich., a corporation of Delaware Original application July 31, 1944, Serial No. 547,360, now Patent No. 2,430,260, dated November 4, 1947. Divided and this application May 18, 1946, Serial No. 670,733

1 Claim. (Cl. 219—10)

This invention relates to a welding method and more particularly to a method for welding fine or thin wires to larger bodies.

This is a division of my copending application Serial No. 547,360, filed July 31, 1944, claiming an apparatus for percussive welding now Patent 2,430,260, dated November 4, 1947.

Very frequently it occurs that it is necessary to weld or permanently secure one end of a small diameter wire to a larger body such as in a socket base and in some of these instances to secure such wire at the bottom of a hole or depression.

It is therefore an object of my invention to provide a method for welding wires or thin structurally weak bodies to larger ones.

It is a further object of my invention to provide a percussive welding method for securing one end of wires at the bottom of depressions.

It is a still further object of my invention to provide a method for welding thin wires to larger bodies rapidly without damage to the wire per se.

With these and other objects in view which will become apparent as the specification proceeds, my invention will be best understood by reference to the following specification and claim and the illustrations in the accompanying drawings, in which:

Figure 3 is an enlarged vertical section taken through the applicator fixture.

Figure 4 is a sectional view taken on line 4—4 of Figure 3, and

Figure 1:
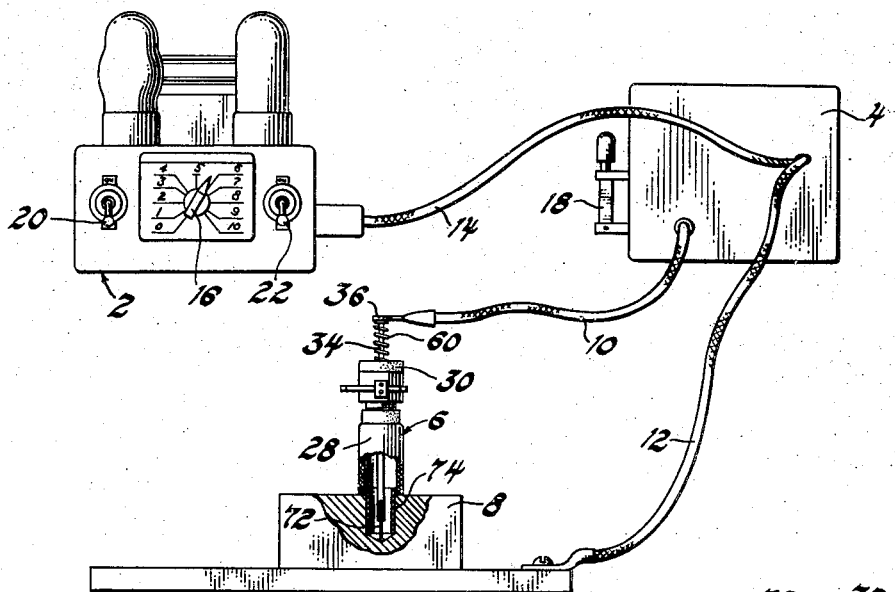
Figure 1 is a schematic diagram illustrating the various parts of my invention, a portion of the actual contact unit being broken away and shown in section.

Briefly, in percussive welding, a condenser of suitable size is fully charged and then connected across the work and the part to be welded thereto, the current flow from the part to the body being sufficient when the condenser discharges to cause fusion of the members and a weld. In my apparatus, therefore, I have provided, as shown in Figure 1, a voltage supply means 2, a condenser bank 4 and an applicator unit 6, the latter being adapted to physically engage the part 8 to which the small wire is to be attached. The lines 10 and 12 connect the condensers to the work piece 8 and the applicator 6. The output of the power supply 2 is conducted through the cable 14 to the condenser bank. The power output is supplied with a regulator 16 so that varying amounts of voltage may be supplied to the condenser bank for different work conditions. The condenser bank is also provided with a number of control switches 18 for varying the capacity of the bank depending upon the size and character of the parts being welded.

In general, the power supply is connected to power lines. Condensers are connected to the wire to be applied to the block and to the block 8, these being held in spaced relation. Knob 16 is set to proper voltage value and switch 20 is closed. Switch 22 is closed to charge the condensers. A cathode ray tube is connected into the circuit later to be described, the pattern of the cathode ray head showing to the operator when the condensers are fully charged. The power is left on to compensate for leakage losses in the condenser circuit. When they are in proper position, the wire being exactly over the point at which it is to be welded, a trigger is operated to release spring means which causes the wire to approach the spot at which it is to be welded at a predetermined rate and when it reaches the surface the condenser discharge takes place causing fusion of the two parts to be secured together. The switch 22 is then turned off and the weld is complete.

Since, however, a majority of the wires to be so secured are not of sufficient mechanical strength to resist bending if of any length and if the speed at which they approach the larger body is appreciable and also may bounce off the surface, I have provided a special applicator or tool to properly apply these wires by the general method above mentioned.

Referring to Figure 3, there is shown therein a main cylinder body 24, the lower portion of which is externally threaded and has thereon an adjustable fiber collar 26. A sleeve 28 of an insulating material is applicable over the lower end of the body 24 and up into engagement with the collar 26. This sleeve is for spacing and also may have a special configuration of the lower surface to permit proper positioning of the whole unit on different contours. The upper end of the body 24 is also externally threaded and has applied thereto a cap 30 of insulating material, this cap having a central opening 32 therein through which projects a long hollow tubular member 34 having a flattened head 36. This hollow tubular member extends down into the main body 24.

The central part of the body 24 is hollow and slidably mounted therein is a member 38 which is also in turn hollow and into which the long tubular member 34 extends. The upper end of the member 38 is of reduced diameter as at 40 and between this section and the inner wall of the body 24 there is housed a compression spring 42, its opposite end bearing against the inner surface of cap 30. The action of this spring tends to force the body 38 to the lower extremity of the body 24 or housing, the lower end of the latter being internally tapered as at 44 and acts as a stop to the downward travel of the member 38.

A small opening 46 in the lower end of the body 24 permits a hollow tube 48 to project therethrough, this tube being rigidly secured to the lower end of the body 38 by a press fit as at 50. Within the tube 48 is slidably mounted a long chuck member 52 of proper dimension to receive the wire to be welded. This chuck member is axially split, as shown at 54, so that the ends may be forced together to grip the wire and extends beyond the end of tube 48, the projecting portion being of larger diameter, as shown at 56, and provided with a bevelled surface 58 which engages the lower end of the tube 48. The upper end of the chuck 52 is screw threaded into the lower end of the hollow rod 34. It will thus be evident that a central small hollow hole is provided throughout the entire length of the unit so that the wire to be welded may be fed down through the whole unit to the gripping jaws of the chuck.

A second coiled or helical spring 60 is provided which is concentric with the upper end of the tubular member 34 having one end bearing against the under surface of the head 36 and against the top of the member 38. This spring tends to eject the tube 34 upwardly which, since the chuck 52 is screw-threaded thereinto, will pull the chuck head upwardly against the bevelled surface 58 and tend to clamp the chuck jaws on the wire. Different internal diameter chucks may be easily substituted depending upon the size of the wire to be used. A transverse sliding member or trigger 62 of insulating material is provided which engages a notch 64 in the member 38 when in one position and when transversely moved has an arcuate section 66 to disengage said member and permit the spring 42 to force the assembly downwardly.

Since this is a percussion welder and operates by condenser discharge, it is important to have the condensers fully charged for each operation in order to maintain a proper power input to the weld. An indication of the charged state of these condensers is provided by connecting in the condenser circuit a tube 70 which is an indicator type cathode ray tube whose active or pattern portion is substantially triangular in shape and closes up upon an increase in applied voltage.

Figure 5:
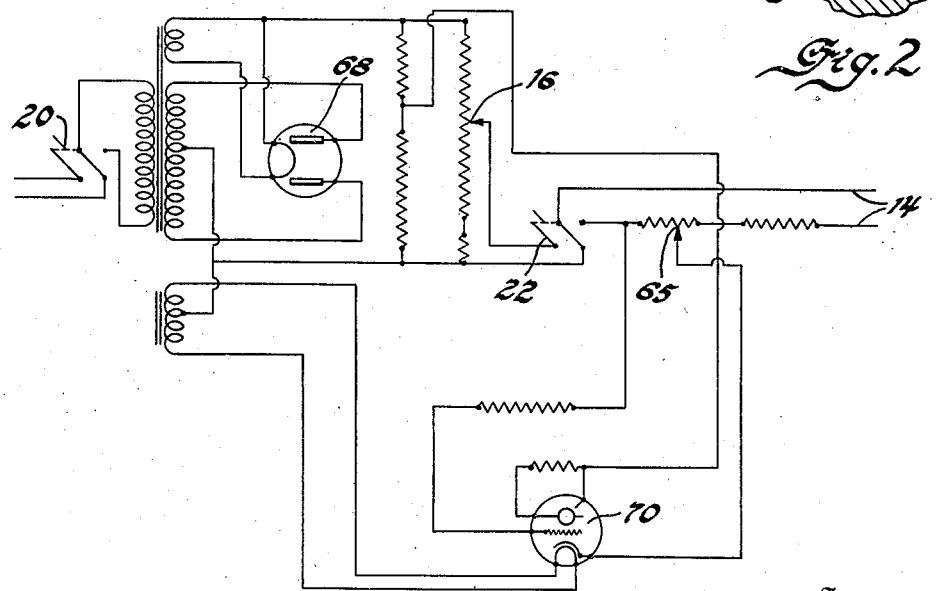
Figure 5 is a circuit diagram showing the power supply unit for my device.

The tuning eye is so arranged in the circuit that when a large current flows through the resistance 65, Figure 5, to charge the condensers this applies a large voltage drop across resistance 65 and the tuning eye and causes it to close. When the condensers are fully charged this current drops to zero and there is no voltage drop across the resistor 65 and hence the tuning eye opens up. By therefore adjusting the voltage to the tube by variable resistor 65 it may be so set as to just open for any one installation or set up for a given series of similar welds. If a different set of circumstances are met then it may have to be again adjusted so that it just opens upon energization but once set, it need not again be adjusted until different conditions arise.

In operation the wire to be welded is fed down through the unit until it projects out beyond the jaws 56 a small amount, for example, a quarter of an inch. During this time the operator presses downwardly on the cap 36 so that the jaws will be open. When in the proper position the cap 36 is released and moves upward and the wire is now clamped and ready for application. The unit is properly positioned over the spot at which the wire is to be welded with the insulating skirt 28 in contact with the work piece and the switch 20 is closed. This applies power to a full wave rectifier tube 68 and by now closing switch 22 the rectifier output is applied to the condensers. By now observing tube 70 the operator can determine when the condensers in the bank 4 have been fully charged assuming this has been set for this type of weld. The operator must use care at this time not to touch the exposed conductive portions of the applicator as they are directly connected to the charged condensers, but most of the exterior surface of the applicator is made of insulating material such as micarta or fiber. At this time the insulating cross slide 62 may be moved until the notch 66 is in alignment with the lip on the member 38 and spring 42 then causes member 38 to rapidly descend bringing the projecting end of the wire, as illustrated at 72, into contact with the body 8 permitting condenser discharge and fusion. At this time the power supply may be de-energized.

Figure 2:
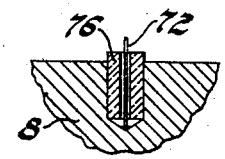
Figure 2 is a vertical section taken through the actual welding portion to show the finished weld.

When the end of the wire 72 engages the piece to which it is to be welded, since it only projects a small distance beyond the end of the chuck, it will not buckle and since the chuck is so designed the latter may slide upon the surface of the wire as the wire stops and the chuck tends to proceed slightly beyond its original gripping position. If it is desired to weld the wire to the bottom of a hole, different insulating sleeves such as 74 may be inserted into the hole during welding and porcelain insulators such as 76 shown in Figure 2 may be inserted thereafter to maintain it in proper position. Therefore, all that is necessary to prepare the apparatus is to cock the main drive spring 42 and properly position the wire and chuck in relation to the point at which the weld is to be made.

It will also be obvious that through the use of different diameter openings through the chuck a variety of different sized wires can be accommodated and through the amount of projection of the chuck and tube 48 satisfactory welds can be made at the bottom of small diameter deep holes.

I claim:

In a method of percussively welding two members together by the steps of discharging a storage condenser which is connected to the two members in spaced relation, the steps of causing one member to approach the other at appreciable speed, lightly frictionally supporting one of the members so that upon contact of the two members there will be maintained a substantially constant engaging force between the members during welding.

WINFIELD J. TROTT.

REFERENCES CITED

The following references are of record in the file of this patent:

UNITED STATES PATENTS

| Number | Name | Date |
| --- | --- | --- |
| 2,145,274 | Pfanstiehl | Jan. 31, 1939 |
| 2,145,276 | Pfanstiehl | Jan. 31, 1939 |
| 2,279,316 | Herzog | Apr. 14, 1942 |
| 2,308,658 | Jendresen | Jan. 19, 1943 |
| 2,316,597 | Kershaw | Apr. 13, 1943 |